(12) United States Patent
Kataoka et al.

(10) Patent No.: US 7,714,470 B2
(45) Date of Patent: May 11, 2010

(54) RESOLVER AND BRUSHLESS MOTOR

(75) Inventors: Nakaba Kataoka, Kyoto (JP); Keita Nakanishi, Kyoto (JP); Yoshiaki Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 297 days.

(21) Appl. No.: 11/859,944

(22) Filed: Sep. 24, 2007

(65) Prior Publication Data
US 2008/0073987 A1  Mar. 27, 2008

(30) Foreign Application Priority Data
Sep. 26, 2006 (JP) .............................. 2006-259887

(51) Int. Cl.
*H02K 24/00* (2006.01)
(52) U.S. Cl. .......................... 310/71; 310/168; 439/585
(58) Field of Classification Search .................. 310/71, 310/68 B, 168
See application file for complete search history.

(56) References Cited

U.S. PATENT DOCUMENTS

| | | | |
|---|---|---|---|
| 4,132,460 A * | 1/1979 | Porta ........................... | 439/575 |
| 4,672,348 A * | 6/1987 | Duve ........................... | 336/192 |
| 5,770,902 A | 6/1998 | Batten et al. | |
| 5,920,135 A * | 7/1999 | Ohshita ........................ | 310/71 |
| 6,707,185 B2 * | 3/2004 | Akutsu et al. ................. | 310/71 |
| 6,753,629 B2 | 6/2004 | Doi et al. | |
| 6,815,853 B2 * | 11/2004 | Koyama et al. ............... | 310/71 |
| 7,105,961 B2 * | 9/2006 | Tetsuka et al. ................ | 310/71 |
| 7,453,175 B2 * | 11/2008 | Nakanishi et al. ......... | 310/68 B |
| 7,476,996 B2 * | 1/2009 | Makiuchi et al. .............. | 310/71 |
| 7,595,572 B2 * | 9/2009 | Haga et al. .................... | 310/71 |
| 2003/0006666 A1 * | 1/2003 | Mimura ....................... | 310/254 |
| 2003/0230945 A1 | 12/2003 | Okubo et al. | |
| 2004/0263010 A1 * | 12/2004 | Sato et al. ..................... | 310/71 |
| 2005/0280320 A1 * | 12/2005 | Utsumi et al. ................ | 310/43 |
| 2007/0205679 A1 * | 9/2007 | Terauchi et al. .............. | 310/71 |
| 2007/0241625 A1 | 10/2007 | Terauchi | |

FOREIGN PATENT DOCUMENTS

DE  101 30 117 A1  1/2003
JP  3251560 B2  1/2002

OTHER PUBLICATIONS

Official communication issued in counterpart German Application No. 10 2007 044 230.2, mailed on Dec. 22, 2008.
Kataoka et al.; "Brushless Motor"; U.S. Appl. No. 11/859,950, filed Sep. 24, 2007.

* cited by examiner

*Primary Examiner*—Burton Mullins
(74) *Attorney, Agent, or Firm*—Keating & Bennett, LLP

(57) ABSTRACT

A connector portion of a resolver stator includes a connecting portion to which a lead wire is connected and a guiding groove which guides the lead wire in an axial direction. The lead wire connected to the connecting portion is retained by the guiding groove and guided in the axial direction.

10 Claims, 9 Drawing Sheets

RESOLVER AND BRUSHLESS MOTOR

BACKGROUND OF THE INVENTION

1. Field of the Invention

The present invention relates to a connection structure between a resolver and a lead wire.

2. Background of the Related Art

A resolver is usually used in a brushless motor in order to detect a rotational position of a rotor magnet arranged in the brushless motor. The resolver includes a resolver stator having at an inner circumference thereof a plurality of teeth, and a resolver rotor arranged radially inwardly of the resolver stator. The resolver rotor arranged in a concentric manner with the rotor magnet rotates with the rotor magnet in a uniform manner.

An excitation winding or an output winding is wound around each tooth. When the resolver rotor rotates, its radial gap formed between the resolver stator will be modified causing a voltage generated by the output winding to be changed. The resolver detects the change in the voltage so as to detect the rotary portion of the rotor magnet within the brushless motor.

The excitation winding or the output winding wound around each tooth is connected to one end of a terminal member arranged at the resolver stator. The lead wire is connected to the other end of the terminal member. The lead wire connects an external control device and the resolver.

As described above, the lead wire is connected to the terminal member of the resolver. This connection, however, may be broken when a motor including such resolver is included in an automobile, or the like, which may be vibrated or shaken. That is, the lead wire, in particular the connection thereof with the terminal member, may be damaged due to an external force.

Needless to say, reliability is required of the connection between the terminal member and the lead wire. Also, it is required that the resolver be small in size due to a limited space in which the resolver will be arranged. That is, it is important that the resolver is designed to be small in size while providing a secure connection with the lead wire.

Conventionally, a resolver has been available in which, in order to have a reduced radial size, a terminal pin thereof and a lead wire extend in a direction along a rotational axis. However, the lead wire in such resolver will be guided in a circumferential direction and then guided in an axial direction of the stator. Therefore, when an external force in the circumferential direction is applied to the lead wire, the force may be conducted to a portion connecting the lead wire with the resolver.

In order to connect the lead wire to the resolver, a method in which a separate component is arranged therebetween has been available. However, this method will increase a production cost.

SUMMARY OF THE INVENTION

A resolver and a brushless motor according to a preferred embodiment of the present invention each include a connector portion to which a lead wire is connected, and a guiding portion which guides the lead wire in an axial direction. The lead wire connected to the connecting portion is retained by the guiding portion and guided in the axial direction. By virtue of such configuration, it becomes possible to design the resolver to have reduced radial dimension and providing a secure connection with the lead wire.

Other features, elements, steps, characteristics and advantages of the present invention will become apparent from the following detailed description of preferred embodiments thereof with reference to the attached drawings.

DETAILED DESCRIPTION OF THE PREFERRED EMBODIMENTS

Figure 1:
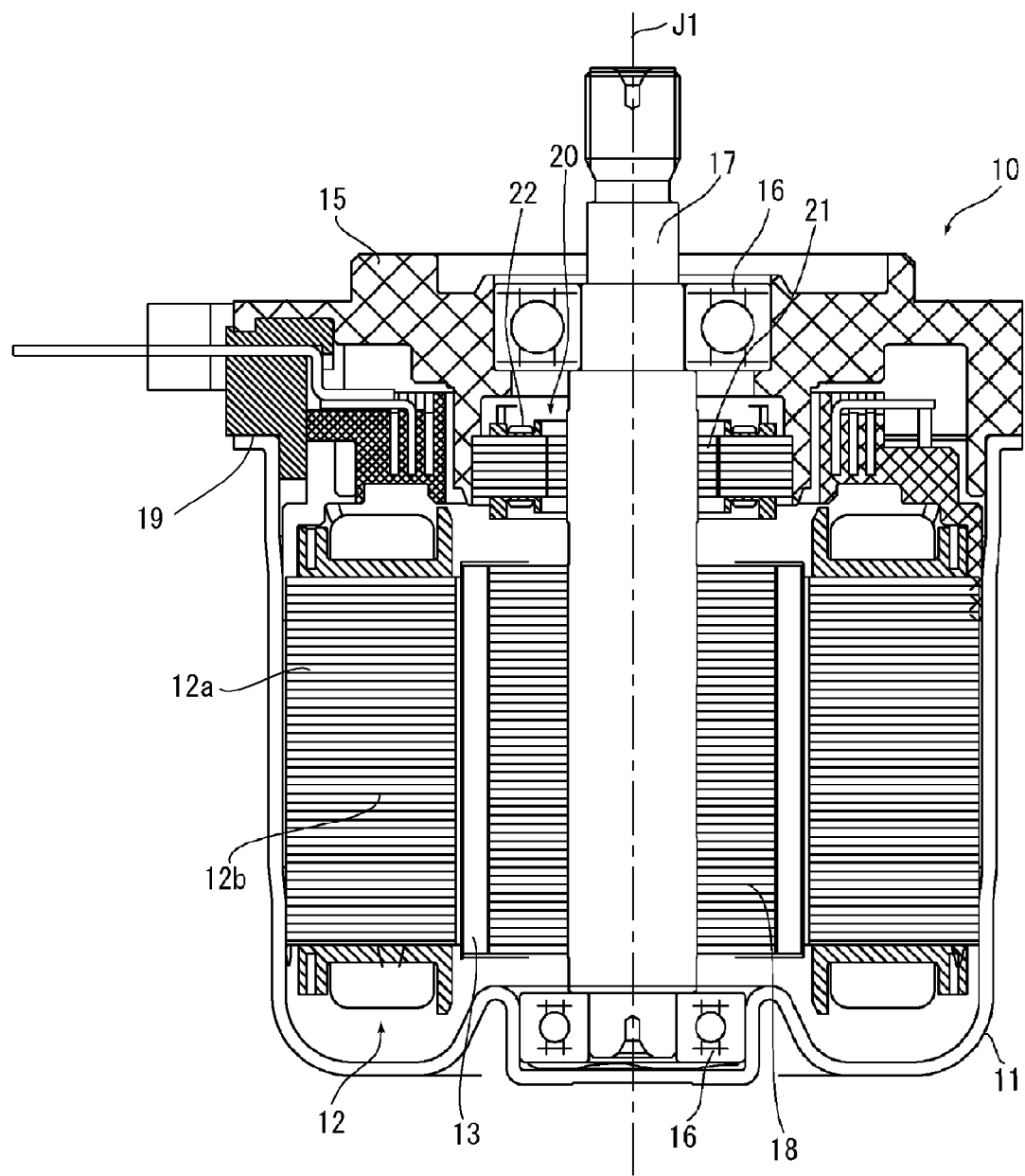
FIG. 1 is a cross sectional view of a brushless motor according to a preferred embodiment of the present invention.

Hereinafter, preferred embodiments of the present invention will be described with reference to FIG. 1 to FIG. 9. Note that in the description of the preferred embodiments of the present invention herein, words such as upper, lower, left, right, upward, downward, top, and bottom for describing positional relationships between respective member and directions merely indicate positional relationships and directions in the drawings. Such words do not indicate positional relationships and directions of the member mounted in an actual device. Also, note that the reference numerals, figure numbers and supplementary descriptions are shown below for assisting the reader in finding corresponding components in the description of the preferred embodiments below to facilitate the understanding of the present invention. It should be noted that these expressions in no way restrict the scope of the present invention.

FIG. 1 is a cross sectional view of a brushless motor 10 including a resolver 20 according to a preferred embodiment of the present invention.

The brushless motor 10 preferably includes a housing 11 preferably having a substantially cylindrical shape with a closed end and concentric with the central axis J1. The housing 11 preferably includes therein a stator 12 and a rotor magnet 13. An upper portion of the housing 11 is open and has mounted therein a bracket 15. The bracket 15 and the housing 11 each preferably include a ball bearing 16 which is a bearing portion thereof. The ball bearing 16 rotatably supports a shaft 17. Also, a resolver 20 is retained by the bracket 15.

The stator 12 is arranged at an inner surface of the housing 11. The stator 12 preferably includes a core back portion 12a preferably having a substantially annular shape and a plurality of teeth 12b each extending in a radially inward direction from the core back portion 12a. The rotor magnet 13 is arranged at an outer circumferential surface of a yoke 18 which is arranged at the shaft 17. Also, the rotor magnet 13 rotates uniformly with the shaft 17 about the central axis J1.

The shaft 17 preferably has secured thereon a resolver rotor 21 of the resolver 20 which is a position detection mechanism. Also, a resolver stator 22 is affixed to the bracket 15 radially opposite from the resolver rotor 21.

With such configuration, the resolver 20 detects a rotational position of the rotor magnet 13. A control device (not shown) supplies to a predetermined coil arranged around the tooth 12b disposed in the stator 12 electricity in accordance with the rotational position of the rotor magnet 13 in order to change the magnetic pole of each tooth 12b causing the rotor magnet 13 to rotate. By virtue of such configuration, the brushless motor 10 generates a rotary drive force.

Figure 2:
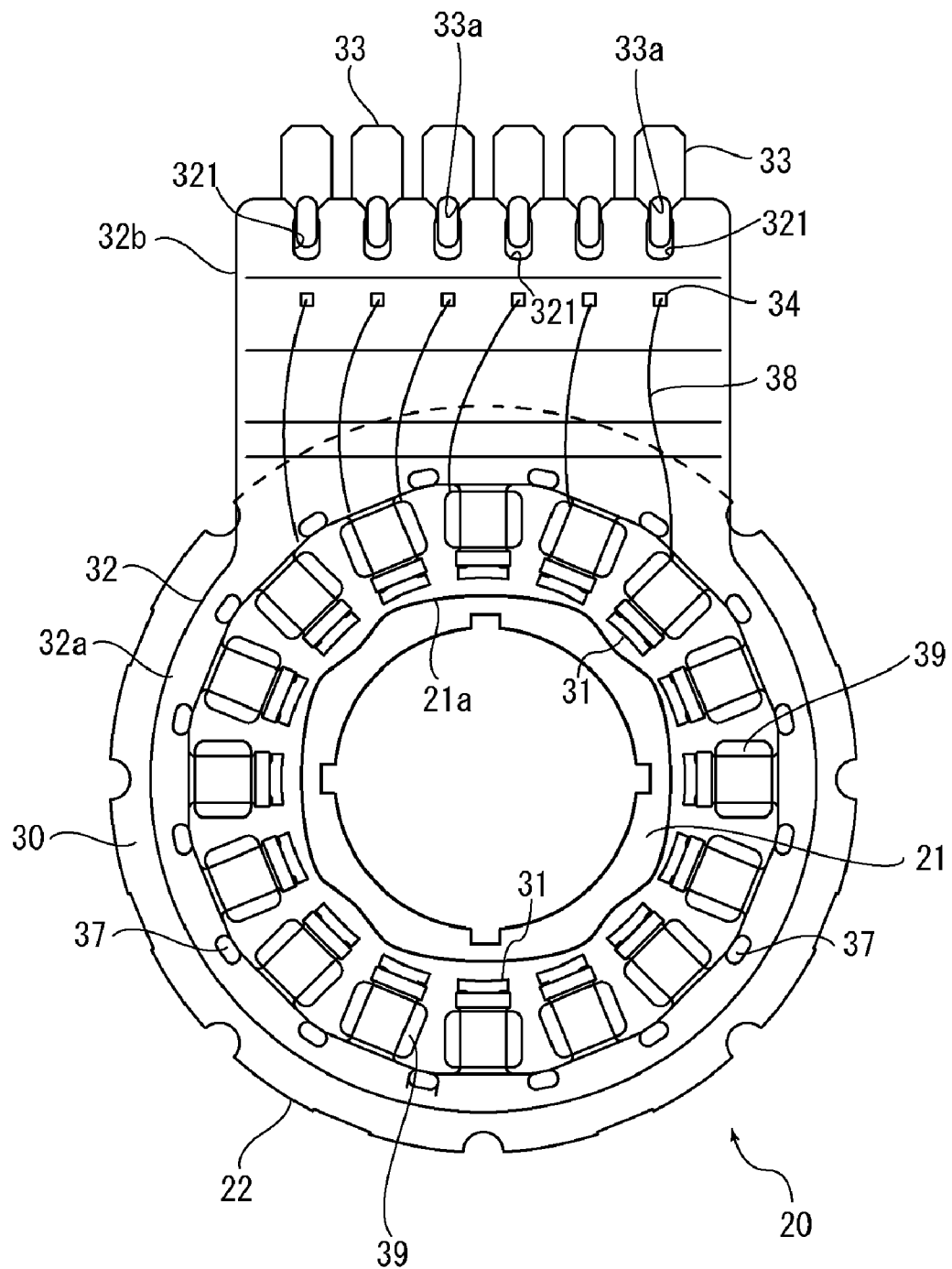
FIG. 2 is a plan view of a resolver according to a preferred embodiment of the present invention.
Figure 3:
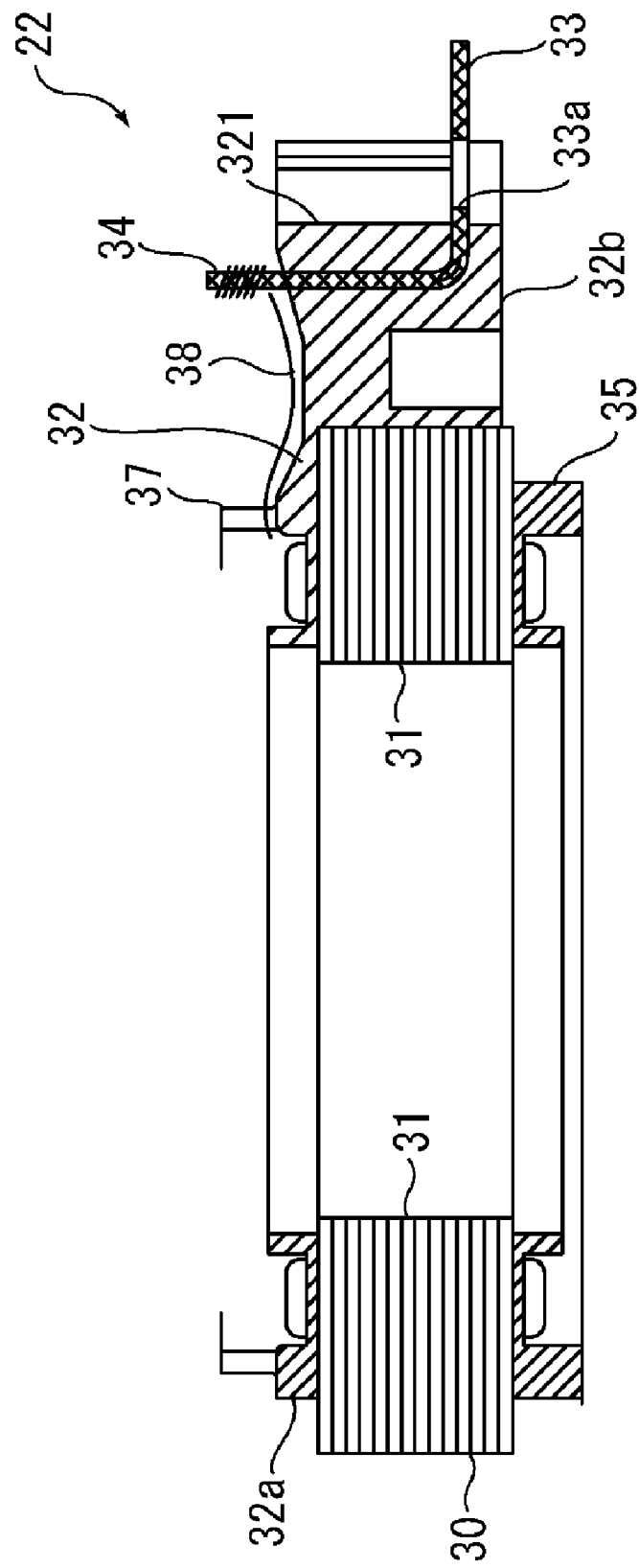
FIG. 3 is a cross sectional view of a resolver stator according to a preferred embodiment of the present invention.

FIG. 2 is a plan view of the resolver 20 according to the present preferred embodiment of the present invention (i.e., the resolver 20 shown in FIG. 1 is seen from above). FIG. 3 is a cross sectional view of the resolver stator 22 according to the present preferred embodiment of the present invention.

As shown in FIG. 2, the resolver stator 22 preferably includes a core back 30 preferably having a substantially annular shape, and a plurality of teeth 31 arranged inward of the core back 30. Each tooth 31 is arranged opposing to the resolver rotor 21 arranged radially inwardly of the resolver stator 22. As shown in FIG. 2, the resolver rotor 21 has a substantially circular shape having a plurality (for example, 4 in the present preferred embodiment) of protrusion portions 21a. Therefore, when the resolver rotor 21 and the shaft 17 rotate in a uniformed manner, a gap will be generated between the resolver rotor 21 and the teeth 31.

Figure 4:
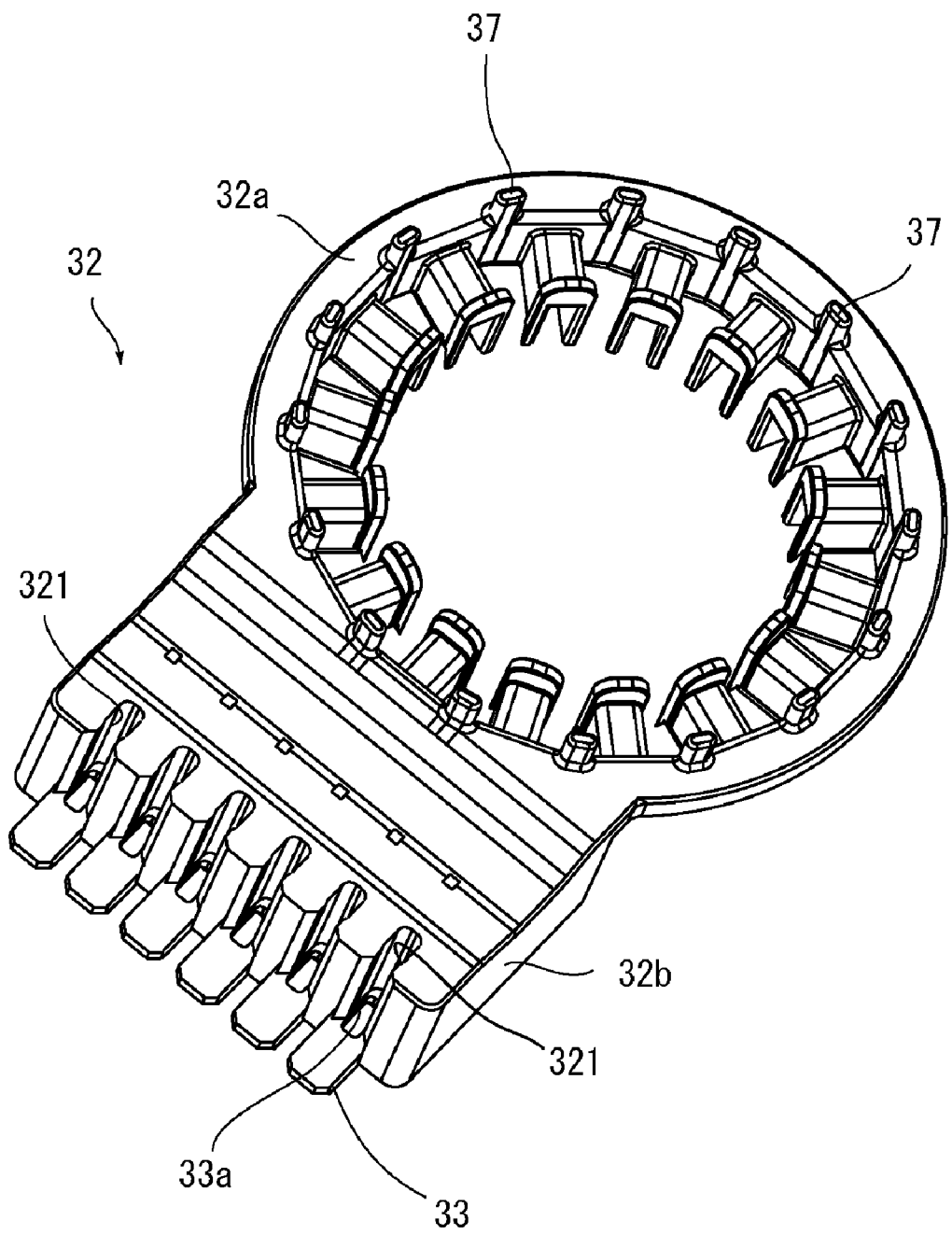
FIG. 4 is a perspective view of an upper side of an insulator according to a preferred embodiment of the present invention.
Figure 5:
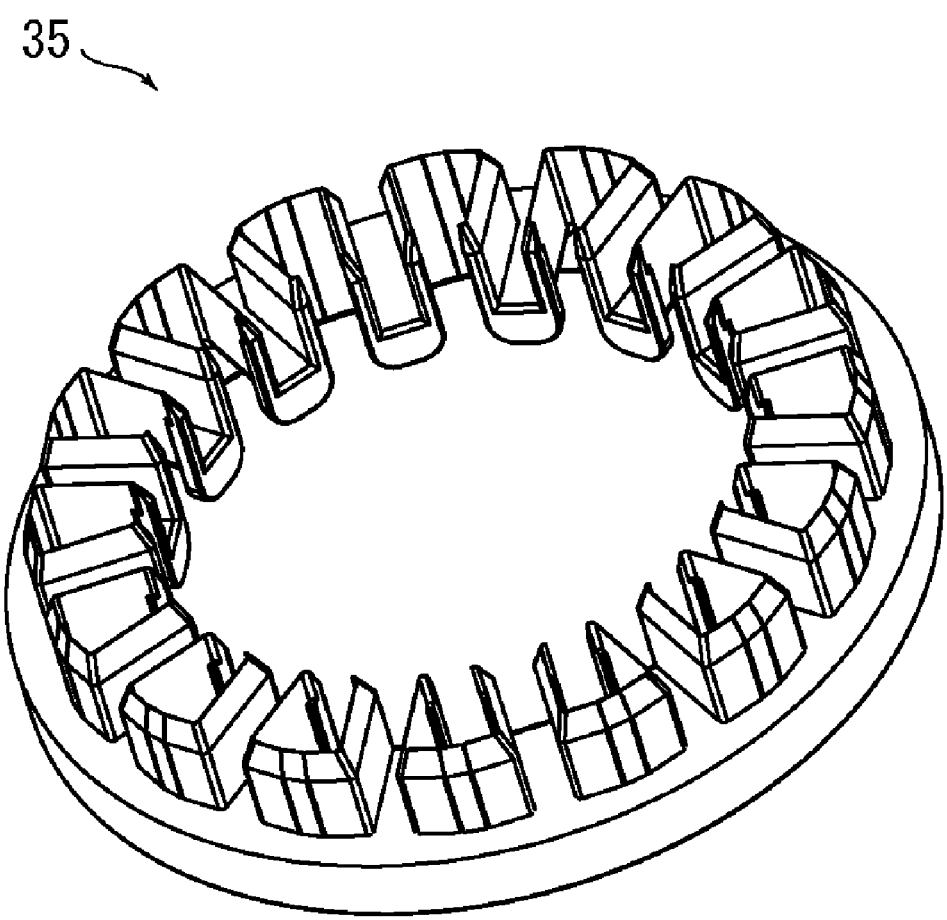
FIG. 5 is a perspective view of a lower side of the insulator according to a preferred embodiment of the present invention.

As shown in FIG. 3, an insulator 32 and an insulator 35 each preferably made of a resin material are arranged so as to sandwich the core back 30 in the axial direction. As shown in FIG. 4, the insulator 32 preferably includes at an upper side of the core back 30 an annular portion 32a, and a connector portion 32b extending from an outer circumference of the annular portion 32a in the radially outward direction. Also, as shown in FIG. 5, the insulator 35 is an annular member arranged so as to be opposed in the axial direction to the annular portion 32a via the core back 30. That is, the annular portion of the resolver stator 22 is defined by the annular portion 32a and the insulator 35 sandwiching the core back 30.

The connector portion 32b preferably includes a conductive terminal member. As shown in FIG. 3, the terminal member has a substantially L-shape when viewed from the side with a portion thereof protruding in the radially outward direction further than the connector portion 32b. The terminal member preferably includes a lead wire connecting portion 33 to which a lead wire 51 will be connected (described below). The lead wire 51 is also connected to the control device (not shown). As shown in FIGS. 2 and 3, one end of the terminal member extends upward further than a top surface of the connector portion 32b in order to form a wire connecting portion 34.

As shown in FIG. 2, the connector portion 32b preferably includes a plurality (for example, 6 in the present preferred embodiment) of wire connecting portions 34 arranged linearly. The annular portion 32a preferably includes a plurality of bridge pins 37 arranged evenly apart from one another.

As shown in FIG. 2, a wire 38 is wound about the resolver stator 22. One end of the wire 38 is wound about the wire connecting portion 34 and the other end is wound about the corresponding teeth 31 forming a coil 39. Note that the wire 38 between the wire connecting portion 34 and the tooth 31 is slackened. The wire 38 wound about the tooth 31 is wound about another tooth 31 via the bridge pin 37. The wire 38 will be connected to the wire connecting portion 34 after having been wound about a predetermined number of teeth 31. Also note that the wire 38 between the wire connecting portion 34 and the tooth 31 is slackened.

One of the three wires 38 is an excitation winding wire through which electricity is provided so as to energize the tooth 31. Other two wires 38 are output winding wire for an output voltage. The resolver 20 preferably is a variable reluctance type (VR) resolver in which an input voltage (i.e., sine wave signal) is inputted through the excitation winding, and the output voltage is gained from the output winding wire by using a change in the gap arranged between the resolver rotor 21 and the teeth 31 and caused by the rotation of the resolver rotor 21 in order to detect the rotational position of the rotor magnet 13.

Figure 6:
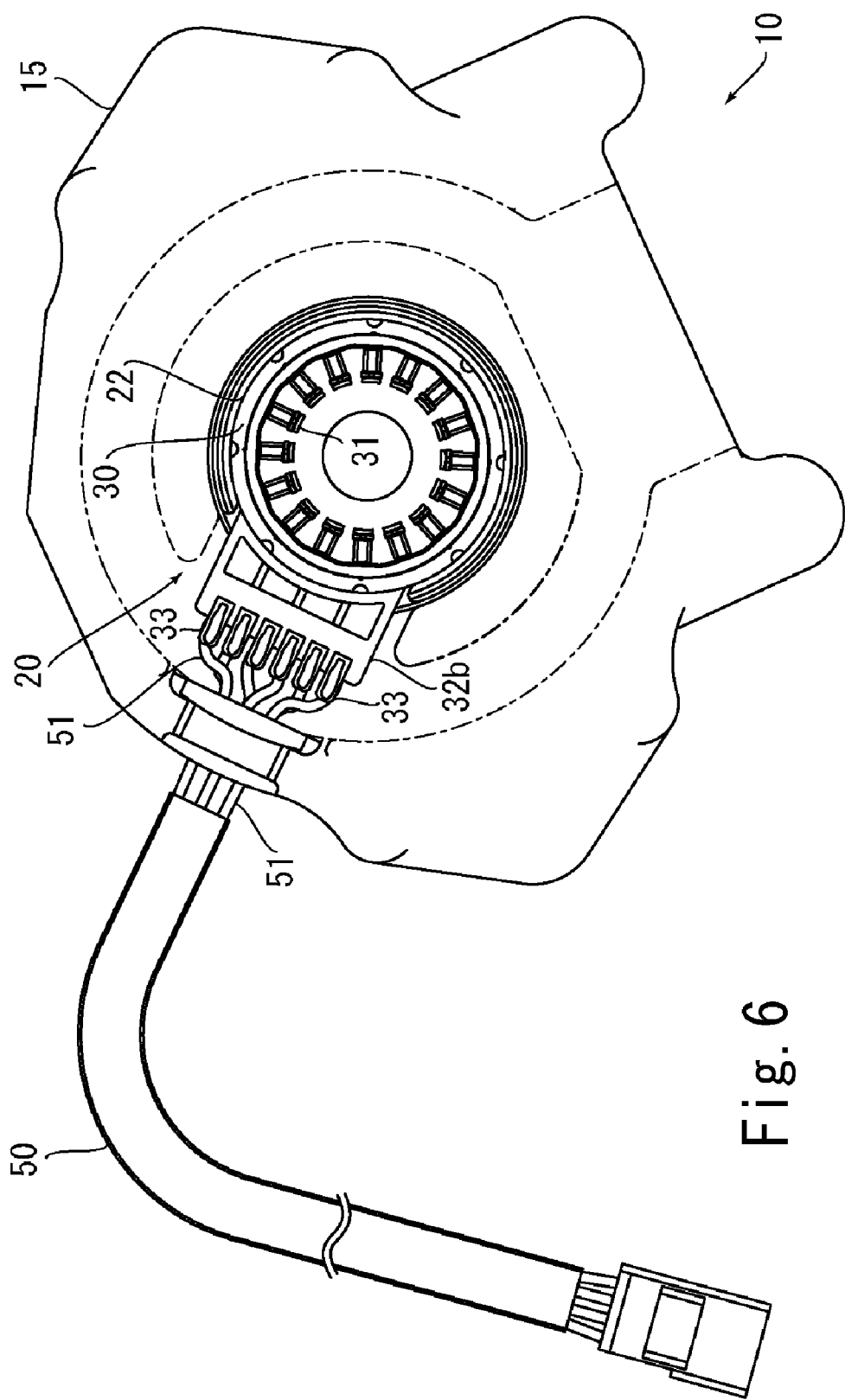
FIG. 6 is a plan view of the brushless motor and the resolver according to a preferred embodiment of the present invention.

Next, a connection structure between the terminal member and a lead wire according to the present preferred embodiment of the present invention will be described. FIG. 6 is a plan view of the brushless motor 10 according to the present preferred embodiment of the present invention. Note that a portion of the bracket 15 is depicted in a see through manner.

As shown in FIG. 6, the plurality of lead wires 51 are connected to the connector portion 32b. A shield member preferably made of a resin material covers the plurality of lead wires 51 so as to form a cable 50 connected to the control device (not shown). The resolver 20 is connected electrically to the control device via the lead wires 51.

Figure 7:
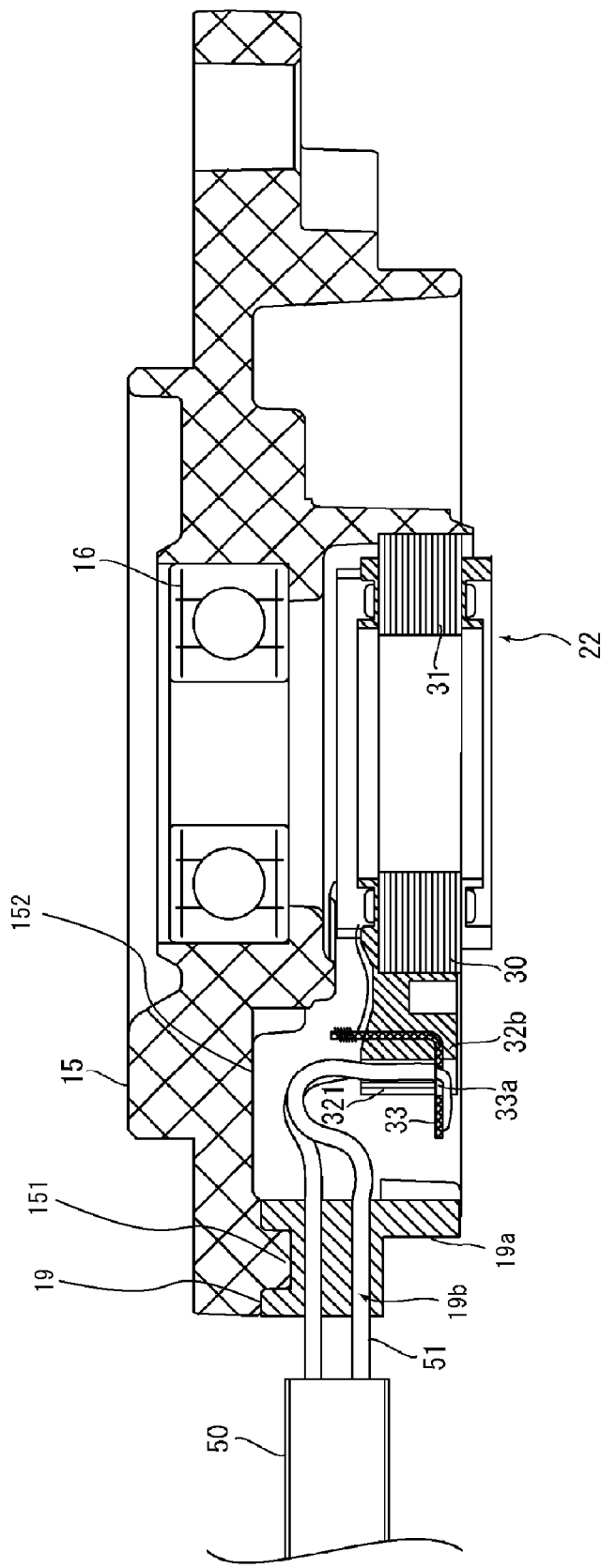
FIG. 7 is a cross sectional view of the resolver showing a connection status of a lead wire according to a preferred embodiment of the present invention.

FIG. 7 is a cross sectional view of the resolver 20 and the bracket 15. As shown in FIG. 7, an extracting portion 19 arranged between an upper end of the housing 11 and a lower end of the bracket 15 preferably includes a sealing portion 19a preferably made of an elastic material via which the lead wire 51 is guided inward of the motor 10 from the control device (not shown). To be more specific, the sealing portion 19a preferably includes an insertion hole 19b through which the lead wire 51 is guided, and seals the inner portion of the brushless motor 10.

Also, as shown in FIG. 7, a protrusion portion 151 is arranged at a bottom surface of the bracket 15 so as to secure the sealing portion 19a to the bracket 15.

Figure 8:
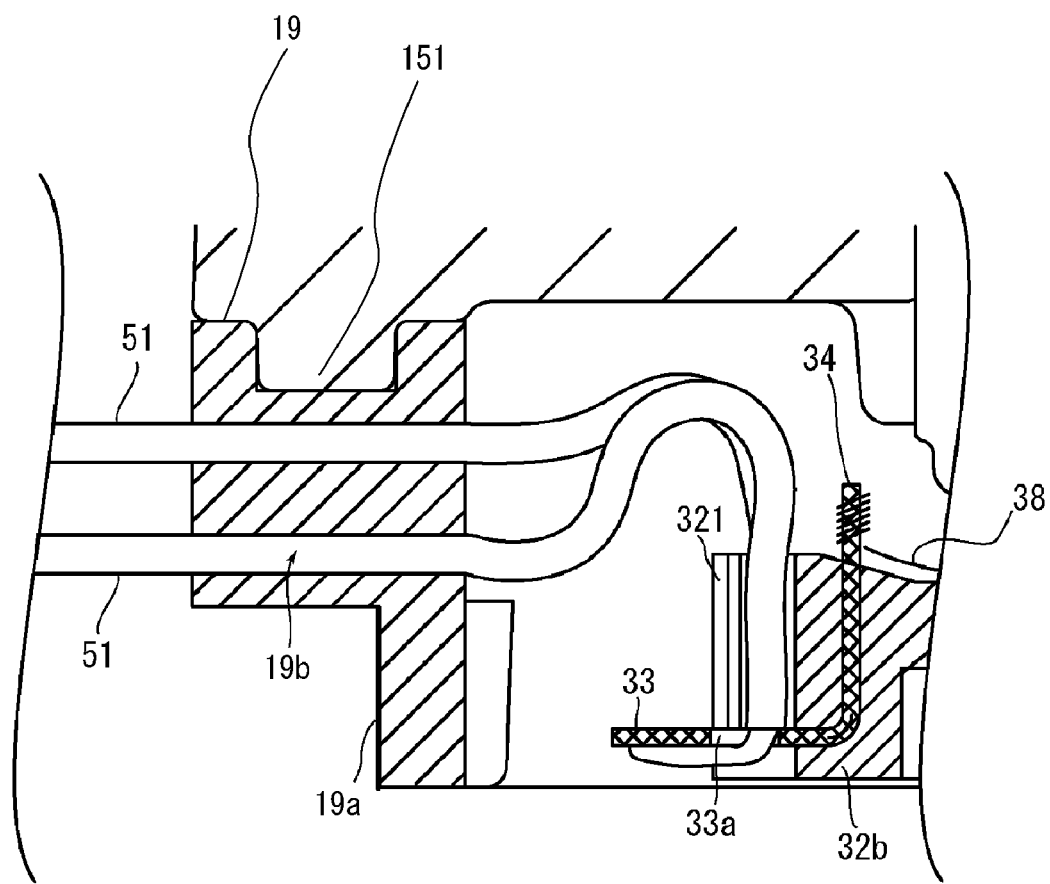
FIG. 8 is an enlarged view of the cross sectional view showing the connection status of the lead wire according to a preferred embodiment of the present invention.

FIG. 8 is an enlarged view of a portion shown in FIG. 7. In particular, FIG. 8 shows the connecting portion between the lead wire connecting portion 33 and the lead wires 51. As shown in FIG. 8, the lead wire 51 guided to the inner portion of the brushless motor 10 via the insertion hole 19b is bent in an upward direction close to an upper portion of the connector portion 32b. At this point, a portion of the lead wire 51 will be accommodated in a concave portion 152 arranged at the bracket 15. Then, the lead wire 51 is bent in a downward direction close to the upper portion of the connector portion 32b and guided to a guiding groove 321 arranged at a radial end portion of the connector portion 32b.

As shown in FIG. 2, the radial end portion of the connector portion 32b preferably includes a plurality (for example, 6 in the present preferred embodiment) of guiding grooves 321 corresponding to a position of each terminal member. The guiding groove 321 in which the lead wire 51 is forced into is a groove extending in a substantially parallel direction with the axial direction of the resolver stator 22. By virtue of such configuration, the lead wire 51 is latched by the guiding groove 321.

Figure 9:
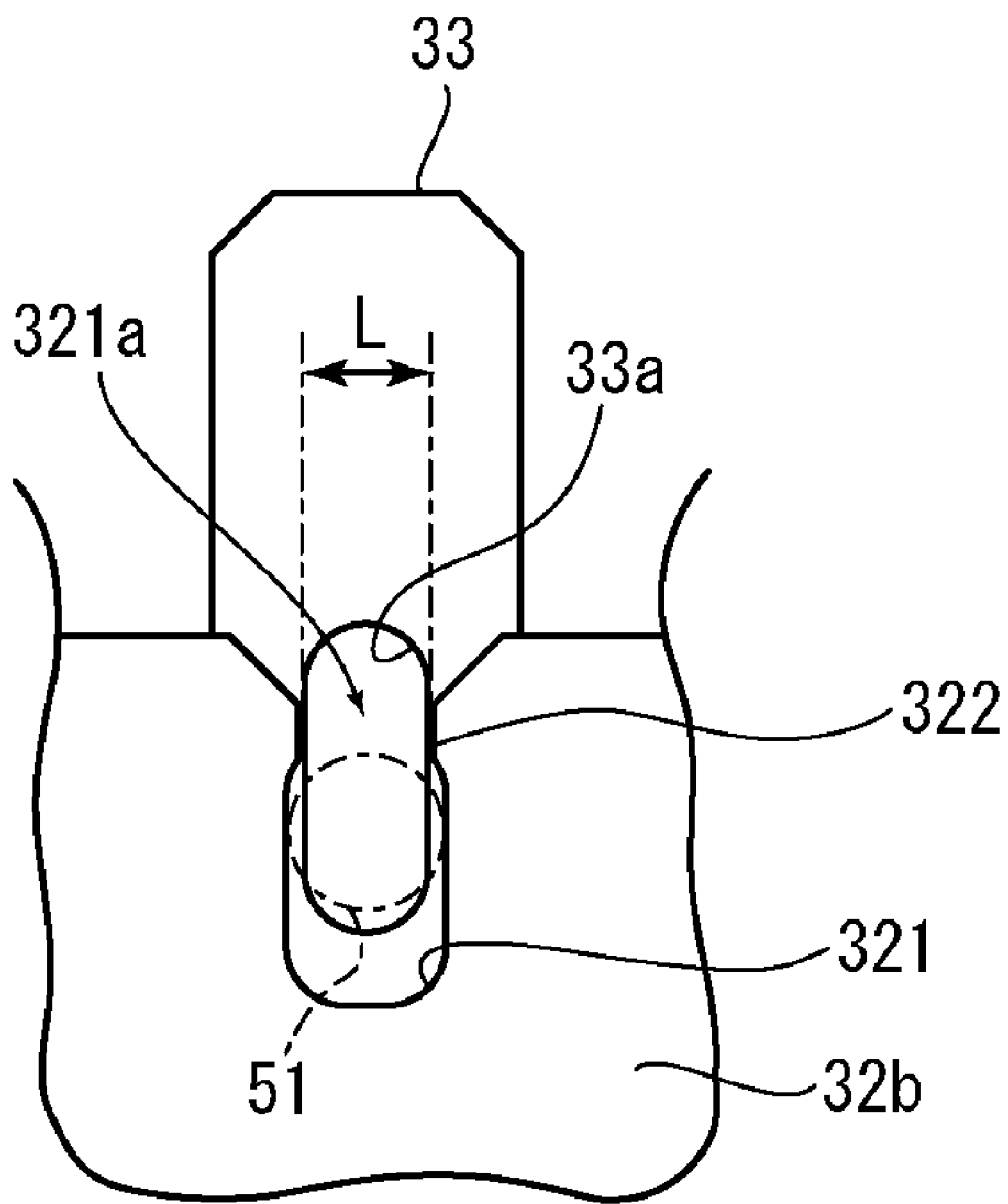
FIG. 9 is a plan view of a guiding groove according to a preferred embodiment of the present invention.

As shown in FIG. 9, the guiding groove 321 preferably has a substantially rectangle shape having round corners. Also, a width of the grove becomes narrower toward an opening portion 321a which is arranged at the radial end portion of the connector portion 32b. That is, the connector portion 32b includes at a portion thereof near the opening portion 321a a protrusion portion 322 which protrudes toward the opening portion 321a. A width L of the opening portion 321a is substantially equal to or smaller than a diameter of the lead wire 51. According to FIG. 9, the width L is slightly smaller than the diameter of the lead wire 51. By virtue of such configuration, no adhesive will be necessary when latching the lead wire 51 in the guiding groove 321 so as to retain the lead wire 51 therein. Also, when an external force is applied to the lead wire 51 in the radial direction and/or in the circumferential direction, the external force will not directly conducted to the connecting portion 33 between the lead wire 51 and the lead wire connecting portion 33.

As shown in FIG. 8, the lead wire 51 extends in a downward direction after the lead wire 51 is guided to the guiding groove 321 from the upper portion of the connector portion 32b. That is, the lead wire 51 will be connected to the lead wire connecting portion 33 via the guiding groove 321. As shown in FIGS. 2 and 9, the lead wire connecting portion 33 preferably includes at an end portion thereof a terminal hole 33a. The lead wire 51 will be soldered, or the like, to the lead wire connecting portion 33 via the terminal hole 33a.

As described above, the terminal member preferably includes the wire connecting portion 34 to which the wire 38 is connected. By this, the control device (not shown) and the coil 39 are connected electrically.

As described above, the connector portion 32b preferably includes the guiding groove 321 which extends in the axial direction and guides the lead wire 51. The width L of the opening portion 321a is equal to or smaller than the diameter of the lead wire 51, and therefore, the lead wire 51 is forced into and retained by the guiding groove 321. The lead wire 51 is connected to the lead wire connecting portion 33 arranged at the bottom end portion of the guiding groove 321. By virtue of such configuration, an external force applied to the lead wire 51 will not be conducted directly to the connecting portion between the lead wire 51 and the lead wire connecting portion 33 minimizing the possibility of damaging the connection. Also, since the lead wire 51 is guided in the axial direction, the radial dimension of the resolver 20 will be reduced, which allows the brushless motor 10 according to the present preferred embodiment of the present invention to have a reduced dimension. That is, the resolver 20 according to the present preferred embodiment of the present invention and the brushless motor 10 having such resolver are suitable for use in a hydraulically operated and/or electrically operated power steering apparatus used in an automobile or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A resolver mounted to a motor, the resolver comprising:
    a resolver rotor; and
    a resolver stator including an annular portion arranged radially opposite from the resolver rotor in a concentric manner with a central axis, and a connector portion extending in a radially outward direction from the annular portion; wherein
    the connector portion includes a connecting portion to which a lead wire is connected, and a guiding groove arranged to guide and latch the lead wire in an axial direction; and
    the guiding groove is a groove extending along the central axis, the guiding groove extends from one axial end of the connector portion to the other axial end thereof, the guiding groove includes at a radially end portion thereof an opening portion into which the lead wire is inserted.

2. The resolver according to claim 1, wherein the connecting portion includes a terminal having an electric conductivity included in the connector portion, and the terminal includes at an axially end portion thereof a lead wire connecting portion to which the lead wire is connected.

3. The resolver according to claim 2, wherein the terminal having a substantially L-shaped configuration includes the lead wire connecting portion and a wire connecting portion extending in the axial direction and above the connector portion.

4. The resolver according to claim 1, wherein the lead wire is force fit into the guiding groove so as to be retained therein.

5. The resolver according to claim 1, wherein a size of the opening portion in a direction that is substantially perpendicular to the central axis is equal to or smaller than a diameter of the lead wire.

6. A motor comprising:
    the resolver according to claim 1;
    a shaft;
    a rotor magnet rotating along with the shaft;
    a stator arranged radially opposite from the rotor magnet;
    a housing having a substantially cylindrical shape retaining the stator and having an opening portion at an axially upper side;
    a bracket arranged to cover the opening portion of the housing; and
    a plurality of bearing portions supporting the rotor magnet with respect to the stator;
wherein
    the bearing portions are spaced apart from one another in an axial direction;
    at least one of the bearing portions and the resolver stator are retained by the bracket; and
    the resolver rotor is secured by the shaft.

7. The motor according to claim 6, wherein an extracting portion is arranged between the housing and the bracket, via which the lead wire is externally guided and includes a sealing portion made of an elastic material and an insertion hole through which the lead wire is inserted.

8. The motor according to claim 7, wherein the bracket, at a portion of the extracting portion, includes a protrusion portion protruding in an axially downward direction.

9. The motor according to claim 6, wherein a first bearing portion which is one of the plurality of bearing portions is retained by the bracket axially above the resolver stator, and a second bearing portion which is another one of the of the plurality of bearing portions is arranged axially below the stator, the bracket includes at a portion radially outward of the first bearing portion a concave portion in which a portion of the lead wire is accommodated.

10. A power steering apparatus comprising the motor according to claim 6.

* * * * *